US011496498B2

(12) United States Patent
Wright et al.

(10) Patent No.: US 11,496,498 B2
(45) Date of Patent: *Nov. 8, 2022

(54) STATISTICAL ANALYSIS OF NETWORK BEHAVIOR USING EVENT VECTORS TO IDENTIFY BEHAVIORAL ANOMALIES USING A COMPOSITE SCORE

(71) Applicant: Webroot Inc., Broomfield, CO (US)

(72) Inventors: William Wright, Los Gatos, CA (US); George D. Kellerman, Louisville, KY (US)

(73) Assignee: Webroot Inc., Broomfield, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/221,475

(22) Filed: Apr. 2, 2021

(65) Prior Publication Data

US 2021/0226972 A1    Jul. 22, 2021

Related U.S. Application Data

(63) Continuation of application No. 16/791,658, filed on Feb. 14, 2020, now Pat. No. 11,012,458, which is a
(Continued)

(51) Int. Cl.
*G06F 21/55* (2013.01)
*G06F 21/50* (2013.01)
(Continued)

(52) U.S. Cl.
CPC ........ *H04L 63/1425* (2013.01); *G06F 21/552* (2013.01); *G06N 7/005* (2013.01); *H04L 63/1416* (2013.01)

(58) Field of Classification Search
CPC ............. H04L 63/1416; H04L 63/1425; H04L 63/1408; H04L 63/1441; H04L 63/20;
(Continued)

(56) References Cited

U.S. PATENT DOCUMENTS 9,516,053 B1 * 12/2016 Muddu ................... H04L 43/00
10,594,710 B2    3/2020 Wright et al.
(Continued)

OTHER PUBLICATIONS

Search Report issued in International Publication No. PCT/US2016/062841, dated Feb. 12, 2017, 11 pages.
(Continued)

*Primary Examiner* — Alexander Lagor
(74) *Attorney, Agent, or Firm* — Sprinkle IP Law Group (57) ABSTRACT

Examples of the present disclosure describe systems and methods for identifying anomalous network behavior. In aspects, a network event may be observed network sensors. One or more characteristics may be extracted from the network event and used to construct an evidence vector. The evidence vector may be compared to a mapping of previously-identified events and/or event characteristics. The mapping may be represented as one or more clusters of expected behaviors and anomalous behaviors. The mapping may be modeled using analytic models for direction detection and magnitude detection. One or more centroids may be identified for each of the clusters. A "best fit" may be determined and scored for each of the analytic models. The scores may be fused into single binocular score and used to determine whether the evidence vector is likely to represent an anomaly.

20 Claims, 6 Drawing Sheets

Related U.S. Application Data continuation of application No. 15/355,561, filed on Nov. 18, 2016, now Pat. No. 10,594,710.

(60) Provisional application No. 62/258,380, filed on Nov. 20, 2015.

(51) Int. Cl.
*H04L 9/40* (2022.01)
*G06N 7/00* (2006.01)

(58) Field of Classification Search
CPC . H04L 63/145; H04L 63/14; H04L 2463/144; H04L 63/1433; H04L 63/1483; G06F 21/55; G06F 21/566; G06F 16/285
See application file for complete search history.

(56) References Cited

U.S. PATENT DOCUMENTS

| | | | |
|---|---|---|---|
| 11,012,458 B2 | 5/2021 | Wright et al. | |
| 2012/0072983 A1* | 3/2012 | McCusker | H04L 63/126 726/22 |
| 2012/0131674 A1* | 5/2012 | Wittenschlaeger | G06F 21/552 726/23 |
| 2015/0128263 A1 | 5/2015 | Raugas et al. | |
| 2015/0235379 A1* | 8/2015 | O'Gorman | G06T 7/269 382/103 |
| 2015/0379887 A1* | 12/2015 | Becker | G06F 16/93 715/229 |
| 2016/0028750 A1* | 1/2016 | Di Pietro | H04W 12/125 726/23 |
| 2016/0267408 A1* | 9/2016 | Singh | G06N 7/005 |
| 2016/0359872 A1* | 12/2016 | Yadav | H04L 63/20 |
| 2016/0381057 A1* | 12/2016 | Das | H04L 63/1425 726/23 |
| 2017/0099304 A1* | 4/2017 | Anderson | G06F 16/285 |
| 2017/0149813 A1 | 5/2017 | Wright et al. | |
| 2017/0364819 A1* | 12/2017 | Yang | H04L 41/0636 |
| 2020/0236125 A1 | 7/2020 | Wright et al. | |

OTHER PUBLICATIONS

Preliminary Report on Patentability issued in International Publication No. PCT/US2016/062841, dated May 22, 2018, 7 pages.

Office Action issued for U.S. Appl. No. 15/355,561, dated Sep. 20, 2018, 22 pages.

Notice of Allowance issued for U.S. Appl. No. 15/355,561, dated Mar. 15, 2019, 16 pages.

Notice of Allowance issued for U.S. Appl. No. 16/791,658, dated Jan. 7, 2021, 16 pages.

* cited by examiner

STATISTICAL ANALYSIS OF NETWORK BEHAVIOR USING EVENT VECTORS TO IDENTIFY BEHAVIORAL ANOMALIES USING A COMPOSITE SCORE

RELATED APPLICATIONS

This application is a continuation of, and claims a benefit of priority under 35 U.S.C. 120 of the filing date of U.S. patent application Ser. No. 16/791,658, filed Feb. 14, 2020, now U.S. Pat. No. 11,012,458 entitled "STATISTICAL ANALYSIS OF NETWORK BEHAVIOR USING EVENT VECTORS TO IDENTIFY BEHAVIORAL ANOMALIES USING A COMPOSITE SCORE" which is a continuation of, and claims a benefit of priority under 35 U.S.C. 120 of the filing date of U.S. patent application Ser. No. 15/355,561, filed Nov. 18, 2016, now U.S. Pat. No. 10,594,710, entitled "STATISTICAL ANALYSIS OF NETWORK BEHAVIOR USING EVENT VECTORS TO IDENTIFY BEHAVIORAL ANOMALIES USING A COMPOSITE SCORE," which is a conversion of U.S. Patent Application Ser. No. 62/258,380, filed Nov. 20, 2015, entitled "BINOCULAR FUSION ANALYTICS SECURITY," the entire contents of which are hereby expressly incorporated herein by reference in its entirety.

BACKGROUND

Digital forensics is often used with digital devices to recover and investigate material related to computer crime. Network forensics is a branch of digital forensics relating to the monitoring and analysis of computer network traffic to, for example, gather (e.g., cluster) information and detect intrusions. Typically, network forensic approaches involve analyzing a volume of data commensurate with a determined probability of identifying a behavioral anomaly. For example, the analysis often includes the use of a behavioral clustering tools to create clustering maps of identified network behavior. Currently, such clustering tools force a selection between directional mapping models and magnitude mapping models. As such, resultant clustering maps often provide an incomplete and suboptimal view and/or analysis of potential behavioral anomalies.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for identifying anomalous network behavior. In aspects, a network event may be observed using one or more sensors. One or more characteristics may be extracted from the network event and used to construct an evidence vector. The evidence vector may be compared to a mapping of previously-identified events and/or event characteristics. The mapping may be represented as one or more clusters of expected behaviors and anomalous behaviors. In aspects, the mapping cluster(s) may be divided into directional clusters, magnitude clusters and/or composite clusters. One or more centroids may be identified for each of the clusters. The evidence vector may be compared to the identified centroids to detect a "best fit" for each cluster. A classification of the "best fit" cluster may be identified and used to determine whether the evidence vector most likely represents an anomaly.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure describes systems and methods for identifying anomalous network behavior. In aspects, a network event or observation may be observed using one or more sensors. A network event, as used herein, may refer to a network transmission, a sensor-based observation, or data associated therewith. A sensor, as used herein, may refer to a device or component for monitoring, analyzing and/or recording real-time network flow (e.g., network packets actively flowing through a network) and/or previously-received network flow (e.g., network packets previously recorded to one or more storage locations). In some aspects, the sensor data may be analyzed to determine one or more characteristics of an observed network event. The determined characteristics may be extracted and used to construct an evidence vector. An evidence vector, as used herein, may refer to an n-dimensional vector of numerical features corresponding to characteristics that represent and/or predict one or more events and/or behaviors. Each numerical features may provide or independently predicting and/or identifying the presence of an anomaly. An anomaly, as used herein, may refer to a network or system intrusion, a user or device misbehavior, unexpected or deviated behavior, a policy violation, trending events/behavior, behavior a device malfunction, device pathology, etc. In examples, an anomaly may be considered adverse, neutral or positive.

In aspects, the evidence vector may be compared to the characteristics of previously-identified events. The characteristics of the previously-identified events may be determined using one or more event of behavioral models. A model, as used herein, may refer to a statistical language model that may be used to determine a probability distribution over one or more word and/or character sequences, and/or to predict a response value from one or more predictors. In examples, a model may be a rule-based model, a machine-learning regressor, a machine-learning classifier, a neural network, or the like. The model may cause the characteristics of the previously-identified events to be represented by one or more clusters on one or more cluster maps or cluster diagrams. A cluster may represent a grouping of related observations and/or a grouping of expected characteristics and behaviors (e.g., anomalous and non-anomalous) for previous events. A cluster map/diagram, as used herein, may refer to a diagram comprising one or more clusters or groups of clusters. In some aspects, the clusters in a cluster map may be divided into a plurality of cluster categories, such as directional clusters and magnitude clusters. A directional cluster, as used herein, may refer to a group of observations whose similarity to one or more cluster centroids has been determined by, for example, a method of vector subtraction sensitive to vector heading or vector bearing. From a directional perspective, vectors having angular directions that are the same or substantially parallel are considered similar, and clusters having angular directions that are orthogonal or substantially orthogonal are considered as dissimilar. In examples, a cluster map formed using a direction-sensitive form of vector subtraction, such as cosine difference, may be referred to as a "directional cluster" map. A magnitude cluster, as used herein, may refer to a group of observations whose similarity to one or more cluster centroids has been determined by a method of vector subtraction sensitive to vector magnitude. From a magnitude perspective, vectors having magnitudes that are arithmetically the same (or substantially the same) are considered similar, and clusters having magnitudes that are arithmetically different (or substantially different) are considered as dissimilar. In examples, a cluster map formed using a magnitude-sensitive form of vector subtraction, such as Euclidian difference, may be referred to as a "magnitude cluster" map. In other aspects, the clusters in a cluster map may be composite clusters representing one or more cluster categories. For example, a composite cluster may comprise one or more characteristics and/or values from clusters in different cluster categories.

In aspects, one or more centroids may be identified for the clusters of a cluster map. A centroid may represent an expected behavior, an unexpected behavior, an anomalous behavior, an non-anomalous behavior, or some combination thereof. A prototype vector may be generated to represent one or more of the centroids. A prototype vector, as used herein, may refer to an n-dimensional vector of numerical features that represents one or more objects, or previous events or behaviors. In examples, an evidence vector may be compared to one or more prototype vectors to determine a "best fit" (e.g., the most similar vector). For example, an evidence vector may be compared to prototype vectors of a directional cluster (e.g., to determine the degree of directional anomaly) and/or to prototype vectors of a magnitude cluster (e.g., to determine the degree of magnitude anomaly). The assessment information resulting from the comparisons may be combined into a composite assessment (e.g., binocular fusion). Alternately or additionally, an evidence vector may be compared to a prototype vector of a composite cluster (e.g., to determine the degree of directional anomaly and magnitude anomaly) to generate a composite assessment. The composite assessment may be used to determine the prototype vector(s) that share the largest amount of characteristics and/or characteristic values with a compared evidence vector. The determined prototype vector(s) may represent the most accurate estimation of behavior for the evidence vector. As a result, the evidence vector may be categorized the same as, or similarly to, the determined prototype vector(s). The evidence vector (and/or the categorization thereof) may then be used to identify whether the network event corresponding to the evidence vector most likely represents expected behavior or anomalous behavior.

Accordingly, the present disclosure provides a plurality of technical benefits including but not limited to: applying analytics models to self-organized maps (SOM)-modeled cluster maps; deriving a plurality of independent assessments for the same observed event; fusing multi-perspective analytics models and/or event assessments to generate binocular models or assessments; comparing binocular event assessment to pre-modeled or historical data to analyze network behavior analysis, reducing the noise and number of candidate anomalies (and, thus, the amount of data to be processed); increasing the probability of detecting anomalies; increasing the visualization of observed events and anomalies; increasing security for online interactions; reduced malware exposure (and, thus, increased processing speed and CPU utilization); and improved efficiency and quality for applications/services utilizing examples of the present disclosure, among other examples.

Figure 1:
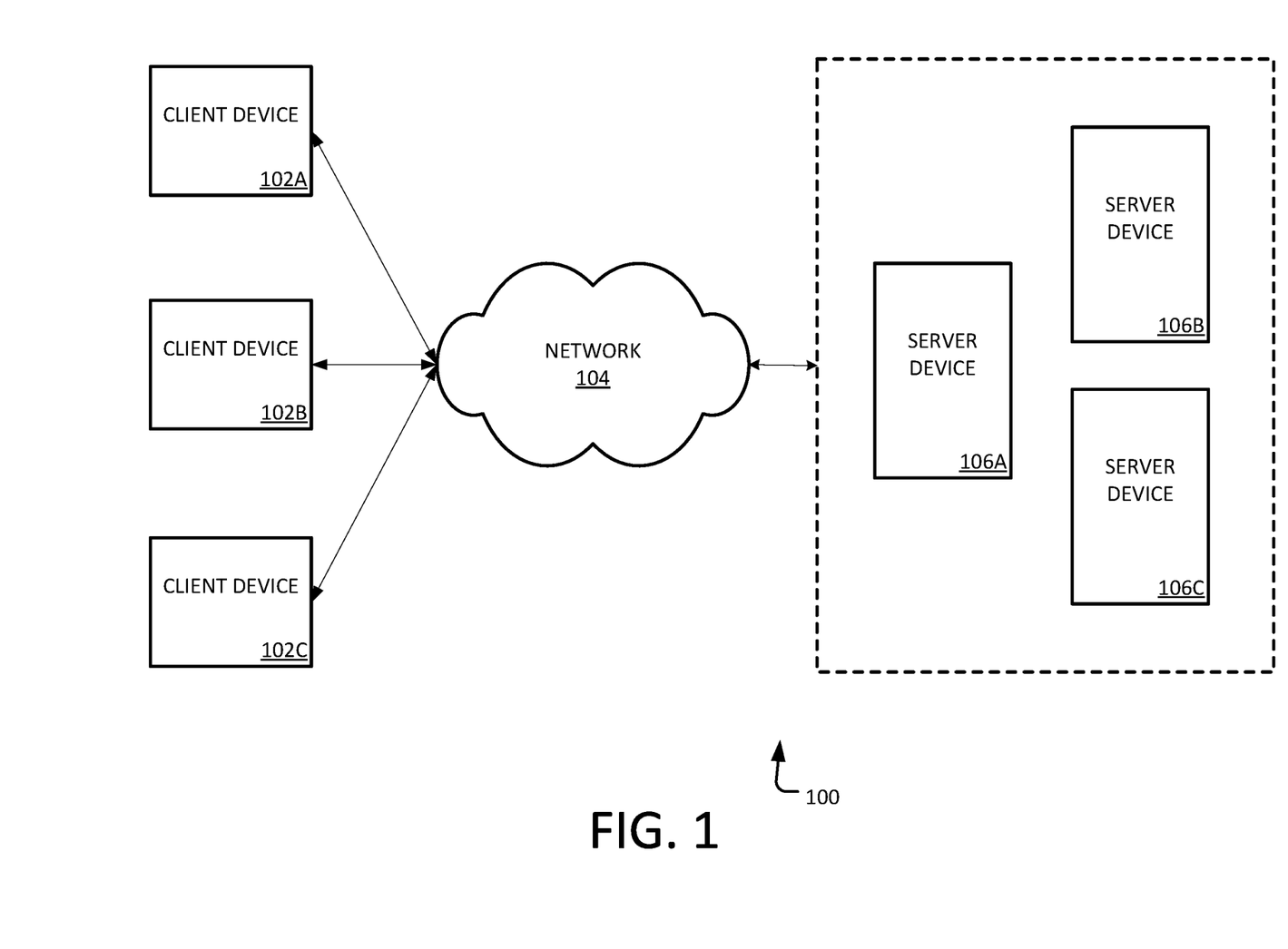
FIG. 1 illustrates an overview of an example system for identifying anomalous network behavior as described herein.

FIG. 1 illustrates an overview of an example system for identifying anomalous network behavior. as described herein. Example system 100 presented is a combination of interdependent components that interact to form an integrated whole for automatic inline detection systems. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an example system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the example operating environments depicted in FIG. 6. In other examples, the components of systems disclosed herein may be spread across multiple devices. For instance, input may be entered on a client device and information may be processed or accessed from other devices in a network, such as one or more server devices.

As one example, the system 100 comprises client devices 102A-C, distributed network 104, and distributed server environment comprising server devices 106A-C. One of skill in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

In aspects, client devices 102A-C may be configured to receive and/or transmit content. Example content may include voice, visual, touch and text data. The content may correspond to one or more behavioral events. Received content may be transmitted to a recipient device via distributed network 104. Recipient devices may include other client devices, server devices, intermediated devices, etc. In examples, one or more of client devices 102A-C may be a different device type and/or may be associated with one or more users. For instance, client devices 102A (e.g., a mobile phone) and 102B (e.g., a tablet) may belong to a first user, client device 102C (e.g., a laptop computer) may belong to a second user.

Server devices 106A-C may be configured to receive and process sensor data. In aspects, server device 106A-C may have access to one or more sensor components. The sensor components may be operable to detect sensor data, such as flow data (e.g., transmitted content) and/or network events and behaviors from one or more Internet of Thing (IoT) sensors. The sensor data may be collected continuously, on-demand, or for specific periods of time. In examples, server device 106A-C may store the sensor data in a data store and/or process the sensor data using one or more processing components or services. Processing the sensor data may include aggregating, grouping and/or de-duplicating the sensor data. The processed data may be used to model one or more events or behaviors. In aspects, modeling the events/behaviors may include extracting characteristics from the processed data and constructing an evidence vector representing one or more portions of the events/behaviors. Server devices 106A-C may store the evidence vector (and associated data) in a data store and/or route the evidence vector to an analytics scoring component. The analytics scoring component may analyze the evidence vector to provide scores for one or more features of the evidence vector during runtime analysis. The analytics scoring component may also evaluate the evidence vector against previously-observed data. In examples, evaluating the evidence vector may include accessing cluster maps for one or more analytics models (e.g., direction detection models, magnitude detection models, etc.), and determining one or more centroids for each cluster on the cluster maps. A prototype vector may be derived for one or more of the centroids. Deriving a prototype vector may include using machine learning techniques to generate, for example, one or more floating point numbers that are modified by self-organizing mapping (SOM) techniques based on previously observed data. Evaluating the evidence vector may further include comparing the evidence vector to one or more prototype vectors to determine a "best fit" for a particular analytics model. In examples, the comparison may include determining the angle and/or the distance between the evidence vector and the closest cluster, or a previously generated probability of the closest cluster. The analytics scoring component may then provide a score for the analyses associated with each of the analytics models. The scores may be combined (e.g., fused) to generate a composite anomaly score.

In aspects, server devices 106A-C may provide a composite anomaly score to a policy component. The policy component may use the composite anomaly score to determine risk, context calculations and security heuristics for a detected event. In examples, the composite anomaly score may be compared to a categorization of previously observed data, or applied to a rule set. As a result, a determination may be made as to whether an event is an anomaly. In some aspects, the policy component may also use contextual factors to modify a composite anomaly score or categorization. The contextual factors may represent facts known by (or provided to) the system. For example, server devices 106A-C may receive an indication that a particular characteristic (or set of characteristics) of an event is likely indicative of anomalous activity, or that a particular analytics model is a more accurate predictor of anomalous activity. The policy component may also collect event data from the sensor component(s). For example, the policy component may identify user and client device information in the sensor data. The identified data may be evaluated against one or more lists (e.g., black lists (of IP addresses/device), white lists, etc.), one or more groups (e.g., member groups, device types, etc.), geolocations, and the like. Based on the evaluations, the policy component may modify a composite anomaly score or categorization. In some aspects, the policy component may provide information, such as policy information, predictions and/or determinations to a model training component. The model training component may use the information to train one or more analytics model on expected behaviors and potentially emergent behaviors. For example, an evidence vector may be "joined" to a set of prototype vectors that matches the centroid of a particular cluster map (thus, becoming a prototype vector of the centroid during future analyses). Server devices 106A-C may record statistics about the joined evidence vectors, training data sets, etc. to, for example, monitor the activity (e.g., popularity, trend analysis, etc.) associated particular clusters for runtime anomaly scoring.

Figure 2:
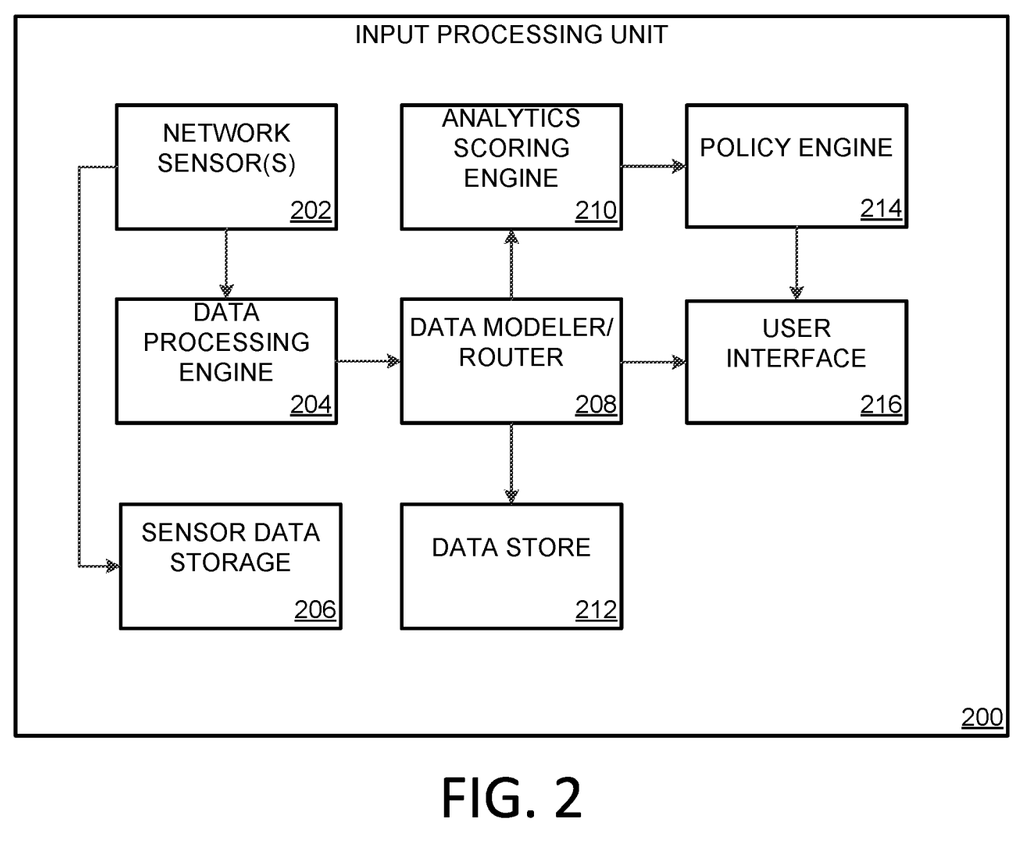
FIG. 2 illustrates an example input processing unit for identifying anomalous network behavior as described herein.

FIG. 2 illustrates an overview of an example input processing device 200 for identifying anomalous network behavior, as described herein. The binocular fusion analytics techniques implemented by input processing device 200 may comprise the binocular fusion analytics techniques and content described in FIG. 1. In alternative examples, a single system (comprising one or more components such as processor and/or memory) may perform processing described in systems 100 and 200, respectively.

With respect to FIG. 2, input processing unit 200 may comprise network sensor(s) 202, data processing engine 208, sensor data storage 206, data modeler/router 208, analytics scoring engine 210, data store 212, policy engine 214 and user interface 216. Network sensor(s) 202 may be configured to detect network transmissions, flow data and behaviors for one of or more devices. The detected data may correspond to one or more network events observation or events. Network sensor(s) 202 may be located on input processing unit 200 and/or one or more device of FIG. 1. For example, network sensor(s) 202 may be dispersed among client devices, sever devices, network switches, firewalls, network or virtual appliances, and the like. Network sensor(s) 202 may record and/or store the received sensor data, client data (e.g., user names, device names, device addresses, etc.) and/or transmission statistics (e.g., number of sent packets, bit rates, error rates, date/time, etc.) in a data store, such as sensor data storage 206. Network sensor(s) 202 may additionally provide sensor data to data processing engine 208. Data processing engine 208 may be configured to process sensor data from network sensor(s) 202. In examples, processing sensor data may comprise aggregating sensor data from one or more sensors, grouping/parsing the data by one or more categories or data fields, de-duplicating and/or counting the sensor data, and analyzing the data (e.g., using a rule set, machine learning, etc.). Processing the sensor data may additionally include using the analyzed data to create security events and/or evaluate/generate preliminary threat scores. In at least one example, processing the sensor data include identifying and extracting one or more characteristics of the sensor data. Data processing engine 208 may provide raw and/or processed data to data modeler/router 208.

Data modeler/router 208 may be configured to model events. In aspects, data modeler/router 208 may apply one or more data models to the sensor data received from data processing engine 208. The data models may be behavioral analytics models that are used to provide analyses for expected and anomalous communications and behaviors. Such behavioral analytics models may include, but are not limited to, direction detection models, magnitude detection models, density detection models, Pearson Linear Correlation models, Mahalanobis distance models, Gaussian affinity models and Jaccard Similarity models. The data models may analyze factors including, client behavior, server behavior, protocol behavior, port behavior, internal/external communications, etc. In examples, such factors may be used to construct one or more feature vectors (e.g., evidence vectors, prototype vectors, composite vectors, etc.). For example, characteristics associated with such factors may be extracted from the sensor data and represented as numeric values. One or more of the numeric values may be inserted into to a feature vector. The data models may track, or be used to track, such factors and behavior (and modifications thereto) over time (e.g., a day, a week, a month, etc.) to provide a historical behavioral perspective. The data models and/or the historical behavioral data may be stored in a data store, such as data store 212. In some aspects, the data models be updated or trained using unsupervised machine learning (e.g., sensor data, previously observed events, unlabeled training data, etc.) and supervised machine learning (e.g., labeled training data, known anomaly data, user feedback, etc. Unsupervised learning, as used herein, may refer a machine learning algorithm for drawing inferences from data sets comprising unlabeled data. Supervised learning, as used herein, may refer a machine learning algorithm for drawing inferences from data sets comprising labeled data. In a particular aspect, data models may use clustering analytics, such as self-organizing maps (SOMs), to machine learn the expected behaviors of a network or computing environment. Data modeler/router 208 may further be configured to route data to one or more other components of input processing device 200. For example, data modeler/router 208 may route data models and event data to analytics scoring engine 210, and raw and processed sensor data to user interface 216.

Analytics scoring engine 210 may be configured to calculate scores for one or more data models. In aspects, analytics scoring engine 210 may analyze one or more received data models and feature vectors to determine one or more behavior or anomaly scores. The analysis may include identifying one or more clusters on a cluster map and generating prototype vectors for one or more centroids of those clusters. The analysis may further include comparing the evidence vector to the prototype vectors to determine the cluster and centroid that are most similar to the evidence vector. In some examples, the comparison includes evaluating factors such as packet counts, byte counts, connection statistics, packet arrival times, etc. In other examples, the comparison may additionally or alternately include determining the angle and/or the distance between the evidence vector and the centroid of the closest cluster, or a previously generated probability of the closest cluster. In yet other examples, the comparison may additionally or alternately include determining a prior probability of the closest cluster for a particular analytical model. Based on the comparison, analytics scoring engine 210 may generate a score for each provided analytics model. For example, the analytics scoring engine 210 may provide a first score for a directional cluster analysis and a second score for a magnitude cluster analysis. In aspects, analytics scoring engine 210 may combine (e.g., fuse) the first and second score using a fusion algorithm to create a composite score. The fusion algorithm may include the use of one or more weighted averages, and may be influenced by one or more contextual factors (e.g., facts known by, or provided, to input processing unit 200). One or more of the three scores (e.g., the first score, the second score and the composite score) may then be provided to policy engine 214.

Policy engine 214 may be configured to determine risk, context calculations and security heuristics for a detected event. In aspects, policy engine 214 may use one or more scores generated by analytics scoring engine 210 to classify an event associated with detected data. For example, policy engine 214 may compare a score to one or more thresholds. The comparison may include the use of machine learning, rule sets and/or pattern matching techniques. In other aspects, policy engine 214 may additionally use user and client device information to compare one or more lists (e.g., black lists (of IP addresses/device), white lists (of IP addresses/device), etc.), one or more groups (e.g., member groups, device types, etc.), geolocations, and the like. Based on the result of the comparison, policy engine 214 may classify an event as an anomaly, modify a score, or modify a classification. In examples, an anomaly may be an adverse event (e.g., related to a potential problem), a neutral event (e.g., unrelated to a potential problem), or a positive event (e.g., related to a potential benefit). Policy engine 214 may use the scores and/or the classification to initiate a security event, such as providing an alarm/alert, quarantining an event, restricting access, etc. In some aspects, policy engine 214 may provide information, such as policy information, scores, predictions and/or determinations to data modeler/router 208. Data modeler/router 208 may use the information from policy engine 214 to train one or more data analytics models on expected behaviors and potentially emergent behaviors.

User interface 216 may be configured to manage and visualize analytics data. In aspects, user interface 216 may receive sensor data and security events from one or more components of input processing device 200. User interface 216 may use the received information to provide for navigating and visualizing anomalies, and managing and analyzing security events. For example, user interface 216 may be operable to present the automated aggregation of anomalies into a time-based topology display to show the evolution of an activity or event. Such presentation capabilities may provide for visually monitoring potentially adverse activity (e.g., reconnaissance, pivoting, command and control, etc.) over a period of time. As another example, user interface 216 may provide a set of configuration options to manage security events and sensor data. The configuration options may include setting and/or modifying thresholds, alerts/alarms, rule sets, permission sets, quarantine data, etc. In some aspects, user interface 216 may be further configured to access and/or manage the functionality of one or more components accessible to input processing unit 200. For example, user interface 216 may provide for configuring a set of policies implemented by policy engine 214, adjusting weighting factors and algorithms implemented by analytics scoring engine 210, training and modifying analytics models implemented by data modeler/router 208, analyzing and reporting on the data stored by sensor data storage 20 and data store 212, adding and/or removing one or more of network sensors(s) 202, etc.

Having described various systems that may be employed by the aspects disclosed herein, this disclosure will now describe various methods that may be performed by various aspects of the disclosure. In aspects, methods 300-500 may be executed by an example system such as system 100 of FIG. 1. In examples, methods 300-500 may be executed on a device comprising at least one processor configured to store and execute operations, programs or instructions. However, methods 300-500 is not limited to such examples. In other examples, methods 300-500 may be performed on an application or service for identifying anomalous network behavior. In at least one example, methods 300-500 may be executed (e.g., computer-implemented operations) by one or more components of a distributed network, such as a web service/distributed network service (e.g. cloud service).

Figure 3:
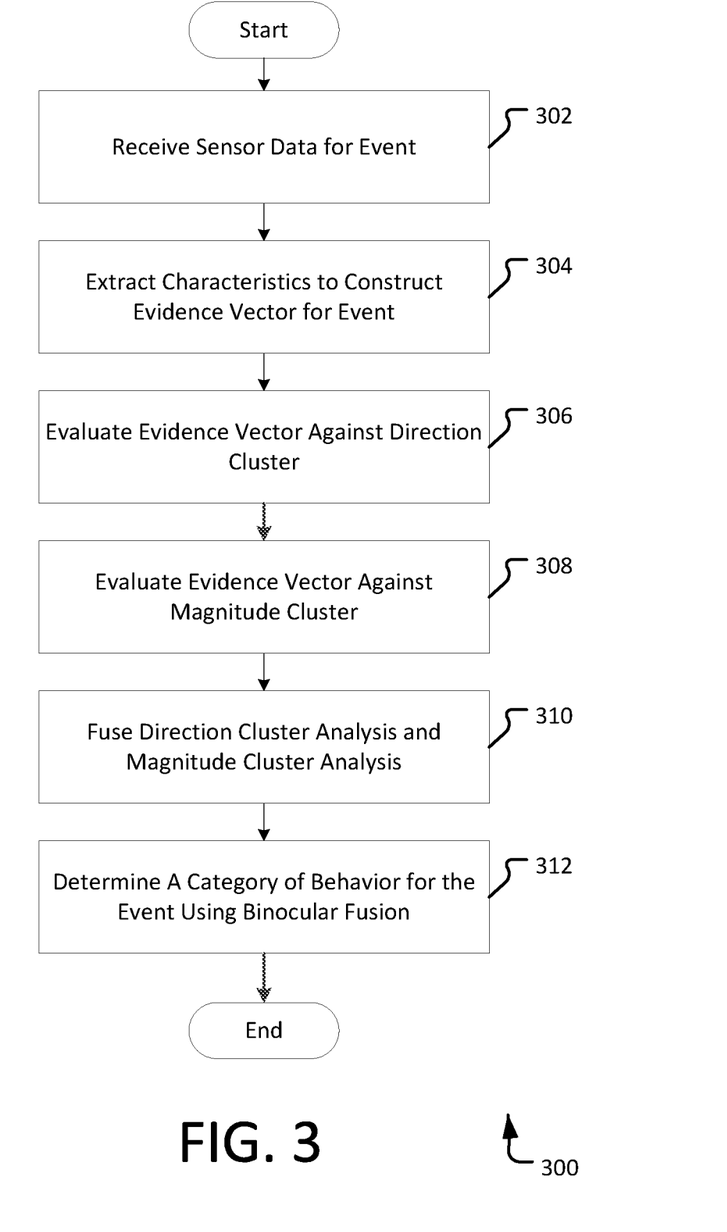
FIG. 3 illustrates an example method of identifying anomalous network behavior as described herein.

FIG. 3 illustrates an example method 300 of identifying anomalous network behavior as described herein. Example method 300 begins at operation 302, where sensor data be received. In aspects, one or more sensing components, such as network sensor(s) 202, may be operable to detect, receive, record and/or analyze sensor data. The sensor data may include or be representative of network data flow, network events (e.g., internal and external events), and/or behaviors from one or more users or Internet of Thing (IoT) devices. As a result, the sensor data may comprise one or more characteristics or features corresponding to the detected events/data. The sensor data may be collected continuously (e.g., at any time a sensing component is online and/or active) or at specific periods of time (e.g., on demand, upon a predefined schedule, etc.). Collected sensor data may be stored in a data store, such as sensor data storage 206, and/or provided to a data processing engine, such as data processing engine 208.

At operation 304, characteristics may be extracted from the sensor data. In aspects, sensor data may be processed by a data processing component, such as data processing engine 204. Processing the sensor data may include aggregating the sensor data for specific time periods, geolocations, users/groups, device types, events/behaviors, etc. The aggregated data may be sorted and de-duplicated, grouped and counted, and/or parsed and analyzed to determine one or more relationships. The processed data may comprise, or be associated with, one or more characteristics or features related to the detected event/data. In examples, the characteristics in the (e.g., processed or raw) sensor data may be identified using machine learning techniques, pattern matching, or other analytic techniques. Examples of characteristics may include packet counts, byte counts, connection counts, connection outcomes, packets sent/received, packet lengths, etc. Identified characteristics may be analyzed and stored to evaluate historical statistics (e.g., 1 day averages, 7 day averages, 30 day averages, etc.) and identify accurate predictors. A predictor, as used herein, may refer to a characteristic or feature of an event that is predictive of whether the event is (or most likely is) an anomaly. One or more characteristics and/or predictors may then be extracted from the sensor data. The extracted characteristics may be converted to features that are expressed numerically (e.g., as floating point numbers, integers, etc.). The features may be normalized between the values 0 and 1, such that values closer to 1 represent consistency with a previous pattern of behavior and values closer to 0 represent a deviation from a previous pattern of behavior. In some aspects, an n-dimensional evidence vector (or instance thereof) representing one or more events/behaviors may then be generated. The normalized values may be inserted into (or assigned to) the evidence vector.

At operation 306, an evidence vector may be evaluated against a directional cluster mapping of previously observed events. In aspects, the evidence vector for a detected event may be applied to one or more analytics models. The analytics models may provide for evaluating the evidence vector against one or more cluster mappings. For example, a direction detecting model may evaluate an evidence vector against a directional cluster mapping comprising one or more clusters. Each cluster may represent an expected behavior (or behavioral tendencies) and include a plurality of n-dimensional protocol vectors, at least one of which corresponds to the centroid of the directional cluster. In examples, protocol vectors may be generated using one or more modeling techniques prior to receiving the sensor data (e.g., prior to runtime anomaly scoring), and may be stored in a data store, such as data store 212. The evaluation of the evidence vector may include accessing and/or generating one or more protocol vectors and/or one or more centroids. The evidence vector may then be compared to one or more protocol direction vectors to determine a "best fit" (e.g., the protocol vector most similar to the evidence vector). The comparison may include, for example, calculating (e.g., using vector differencing, vector similarity measurement, cluster similarity measurement, vector distance formulae, etc.) a difference between corresponding feature values of an evidence vector and a protocol vector. For instance, the calculation may include using a vector similarity measurement based on the intersection of the compared vectors, such as the Cosine Similarity algorithm for vector subtraction. In some aspects, the calculated differences for each feature/characteristic may be provided to a scoring engine, such as analytics scoring engine 210. The scoring engine may use the calculated differences to generate a score. The score may represent the similarity between an evidence vector and a directional cluster centroid, the probability that an evidence vector is representative of a directional cluster of behavior, the probability that the evidence vector is an anomaly, etc.

At operation 308, an evidence vector may be evaluated against a magnitude cluster mapping of previously observed events. In aspects, the evidence vector for a detected event may be applied to one or more analytics models. The analytics models may provide for unsupervised clustering of network behaviors by evaluating the evidence vector against one or more cluster mappings. In examples, a cluster mapping may comprise directional mapping data (as described in operation 306), magnitude mapping data, or some combination thereof. In a particular example, a magnitude detecting model may evaluate an evidence vector against a magnitude cluster mapping comprising one or more clusters. Each cluster may represent an expected behavior (or behavioral tendencies) and include a plurality of n-dimensional protocol vectors, at least one of which may correspond to the centroid of the magnitude cluster. In examples, protocol vectors may be generated using one or more modeling techniques prior to receiving the sensor data (e.g., prior to runtime anomaly scoring), and may be stored in a data store, such as data store 212. The evaluation of the evidence vector may include accessing and/or generating one or more protocol vectors and/or one or more centroids. The evidence vector may then be compared to one or more magnitude protocol vectors to determine a "best fit" (e.g., the protocol vector most similar to the evidence vector). The comparison may include, for example, calculating (e.g., using vector differencing, vector similarity measurement, cluster similarity measurement, vector distance formulae, etc.) a difference between corresponding feature values of an evidence vector and a protocol vector. For instance, the calculation may include using a cluster similarity measurement based on the distance between a point and a distribution, such as the Mahalanobis distance algorithm or Euclidean distance algorithm. In some aspects, the calculated differences for each feature/characteristic may be provided to a scoring engine, such as analytics scoring engine 210. The scoring engine may use the calculated differences to generate a score. The score may represent the similarity between an evidence vector and a magnitude cluster centroid, the probability that an evidence vector is representative of a magnitude cluster of behavior, the probability that the evidence vector is an anomaly, etc.

At operation 310, cluster analyses may be fused. In aspects, one or more facets of the direction detecting analysis may be fused with facets of the magnitude detecting analysis. For example, a score generated using a direction detecting model (e.g., a direction analysis score) and a score generated using a magnitude detecting model (e.g., a magnitude analysis score) may be fused to create a composite (e.g., binocular) score. In at least one example, a direction analysis score, a magnitude analysis score, and a composite score may further be fused to create a total score. The composite score and/or total score may represent the probability that an evidence vector is an anomaly or an unexpected behavior. In examples, the composite/total score may be fused using a fusion algorithm. The fusion algorithm may implement nonlinear regression, neural network regression, and the like. The fusion algorithm may also implement, for example, weighted averaging techniques and may be influenced by one or more contextual factors. Contextual factors may be information known by, or provided to, a behavioral analysis device, such as input processing unit 200. For example, an analysis of trending anomalies (e.g., malware detection, network intrusions, network communications increase, etc.) may be accessible to a behavioral analysis device. The analysis may indicate that the packet count and average packet length of transmissions during an observed time period are strong predictors of anomalous activity. As a result, a fusion algorithm may weight feature values related to packet count characteristics and average packet length characteristics more heavily than other characteristics that are less-predictive of, and/or less strongly correlated to, anomalous activity.

At operation 312, a behavior category for an event may be determined. In aspects, one or more scores may be provided to a policy engine, such as policy engine 214. The policy engine may use one or more scores to provide threat intelligence and countermeasures for an event associated with detected data. For example, a composite score (and/or associated information) for an evidence vector may be evaluated against one or more thresholds for determining behaviors/anomalies. The composite score and associated information may additionally or alternately be evaluated against one or more policy sets, lists (e.g., black lists, white lists, etc.), forensic evidence models, external threat intelligence feeds, geolocations, permission sets, and the like. The evaluation may include the use of machine learning, rule sets and/or pattern matching techniques. Based on the result of the evaluation, a behavioral classification may be determined, a score may be modified, a classification may be modified, or countermeasures (e.g., initiating an alarm/alert, quarantining an event, restricting access, etc.) may be enacted. In at least one aspect, behavioral determination information (e.g., policy information, scores, predictions and/or determinations, etc.) may be used to train one or more data analytics models on expected behaviors and potentially emergent behaviors.

Figure 4:
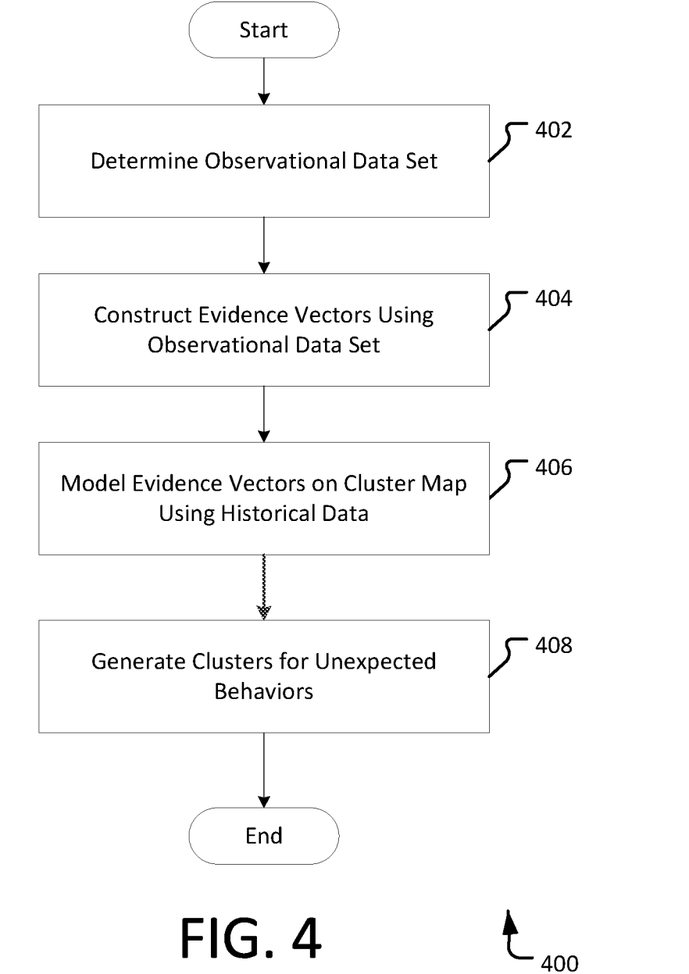
FIG. 4 illustrates an example method of training an analytics model to identify anomalous network behavior as described herein.

FIG. 4 illustrates an example method of training an analytics model to identify network behavior, as described herein. Example method 400 begins at operation 402, where an observational data set is determined. In aspects, the observational data set may correspond to a particular time frame of interest (e.g., the perceived onset of an anomalous event, a period of elevated network flow, the detection of an adverse event, etc.). Alternately, the observational data set may correspond to a predefined time period (e.g., every day from 11:00 am to 1:00 pm) or an event (e.g., detecting a new user/device, detecting a failed access attempt, etc.). In examples, determining an observational data set may include searching a sensor data repository, such as sensor data storage 206, for data received during a specified period of time. The located data may then be aggregated into an observational data set. In at least example, the observational data set may comprise labeled or unlabeled training data.

At operation 404, one or more evidence vectors may be constructed. In aspects, an observational data set may be provided to a characteristics analysis and extraction engine, such as data modeler/router 208. The characteristics analysis and extraction engine may identify one or more characteristics in the observational data set. The identified characteristics may be extracted and used to construct an evidence vector. For example, an observational data set may comprise one or more network transmissions communications, such as IP address by port by IP address (IPxPORTxIP) triplets. The IPxPORTxIP triplets may comprise sender/recipient device information and a set of event characteristics (e.g., packet counts, byte counts, connection statistics, packet arrival times, etc.). The set of characteristics may be converted to features that are expressed using numeric values (e.g., floating point numbers, normalized values, etc.). In examples, the features may be predictive of whether a detected event is (or most likely is) an anomaly. An evidence vector may then be computed for each of the IPxPORTxIP triplets, and the corresponding feature values may be inserted into the evidence vector.

At operation 406, one or more evidence vectors may be modeled. In aspects, the evidence vectors of an observational data set may be provided to one or more data analytics models (e.g., direction detection models, magnitude detection models, etc.). The data analytics models may apply the evidence vectors to one or more cluster maps. For example, a direction detection model may apply a set of evidence vectors to a directional cluster map. The directional cluster map may comprise, for example, 144 prototype vectors. The 144 prototype vectors may be arranged into one or more clusters having one or more centroids. In such an example, the directional cluster map may be represented as a 12×12 cluster map matrix. Each evidence vector may be compared to each of the prototype vectors to determine a best fit (e.g., the protocol vector most similar to the evidence vector). This comparison may include determining the angle and/or the distance between the evidence vector and the centroid of the closest directional cluster, and/or a previously generated probability of the closest directional cluster. Alternately, the comparison may include the use of self-organized map (SOM) techniques. SOM, as used herein, may refer to a type of unsupervised machine learning that produces 2-dimensional mappings of the data sets. For example, SOM techniques may be applied to a set of evidence vectors to generate a normalcy map. The normalcy map may be initialized at, or close to, zero. SOM may be used to incrementally modify the evidence vectors based on historical observed data, such that the evidence vectors come to resemble the tendencies/behaviors of the historical observed data. As a result, a trained SOM cluster map may comprise evidence vectors that have formed into, or joined, one or more distinct behavioral clusters of one or more analytical models.

At operation 408, one or more unexpected behaviors may be modeled. In aspects, one or more centroids may be modeled on a cluster map to represent one or more unexpected behaviors. These centroids may provide for classifying and mapping unexpected behavior that emerge during runtime evaluation (e.g., after a cluster map has been created and/or populated). For example, a network may identify 40 types of expected network behavior using historical observed data. A cluster map comprising a 10×4 matrix of expected behaviors may be created. Each of the 40 expected behaviors may be represented by a behavior cluster comprising one centroid. If an analytical model evaluating such a cluster map were to encounter a novel characteristic vector (e.g., an anomaly) during runtime anomaly scoring, the analytical model would have to classify the anomalous vector as a member of one of the preexisting behavior clusters. As such, additional centroids representing unexpected behaviors may be added to a cluster map. For example, for the network described above (e.g., having 40 types of expected network behaviors), a cluster map comprising a 10×5 matrix of expected behaviors may be created (for a total of 50 behaviors/centroids). This cluster map may enable up to 10 distinct, emergent behaviors to be mapped to a randomly initialized centroid in the 10 additional centroids (e.g., 10 degrees of freedom). In aspects, the amount of excess freedom modeled in a cluster map may be determined based on, for example, the frequency of emergent behaviors, the amount of time expected to elapse between updates, resource availability, etc. In such aspects, the expected time between model updates may be domain or customer specific, and may depend on corporate policy, the details of service agreement between a customer and a vendor of a security system, etc.

Figure 5:
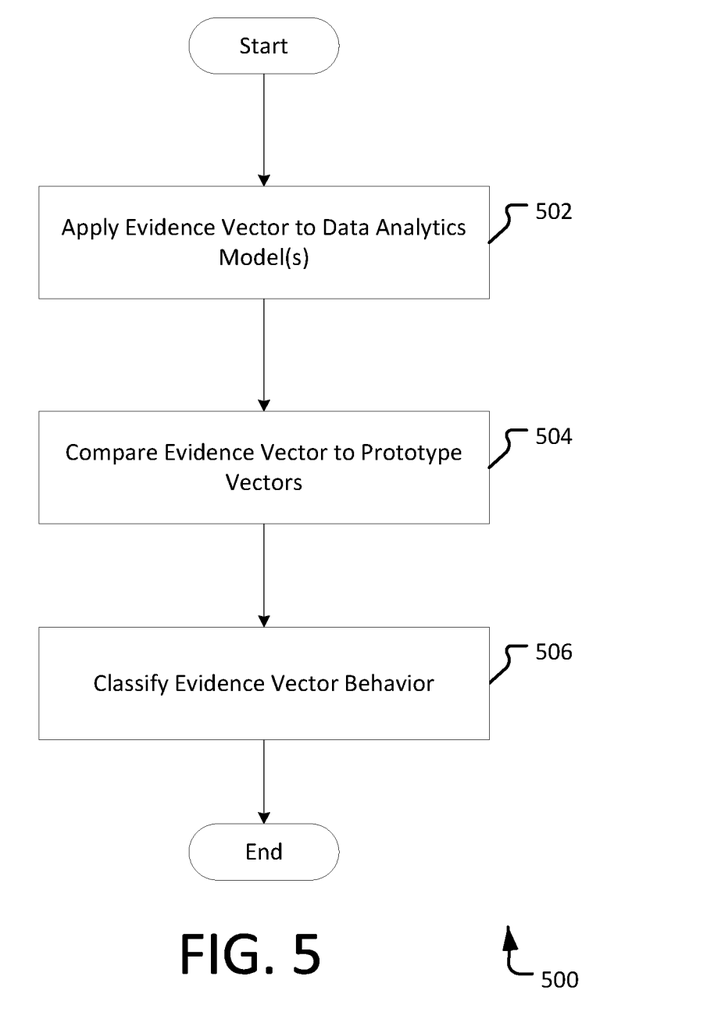
FIG. 5 illustrates an example method for determining candidate anomalies as described herein.

FIG. 5 illustrates an example method for determining candidate anomalies, as described herein. Example method 500 begins at operation 502, where an evidence vector may be applied to a data analytics model. In aspects, one or more evidence vectors for a detected event may be applied to one or more analytics models for the unsupervised machine learning of clustering network behaviors. For example, a magnitude detection model may evaluate an evidence vector to map the evidence vector to a magnitude cluster mapping comprising one or more prototype vectors (e.g., magnitude vectors). As another example, a direction detection model may evaluate an evidence vector to map the evidence vector to a directional cluster mapping comprising one or more prototype vectors (e.g., direction vectors). As yet another example, a composite detection model may evaluate an evidence vector to map the evidence vector to a composite cluster mapping comprising one or more prototype vectors (e.g., composite vectors). In such an example, a composite vector may comprise features from a magnitude vector and a direction vector. For instance, if a magnitude vector is represented as the array [m0, m1, . . . mn] and a direction vector is represented as the array [d0, d1, . . . dn], the corresponding composite vector may be represented as [m0, d0, m1, d1, . . . , mn, dn].

At operation 504, an evidence vector may be compared to one or more prototype vectors. In aspects, an evidence vector mapped to a cluster map may be compared to each of the prototype vectors in the cluster map to determine a best fit (e.g., the protocol vector most similar to the evidence vector). For example, an evidence vector may be compared to one or more directional clusters (e.g., to determine the degree of directional anomaly), magnitude clusters (e.g., to determine the degree of magnitude anomaly) and/or composite clusters (e.g., to determine the degree of directional and magnitude anomaly). This comparison may include determining the angle and/or the distance between the evidence vector and the centroid of the closest cluster, analyzing a previously generated probability of the closest directional cluster, and/or using self-organized map (SOM) techniques.

At operation 506, an evidence vector may be behaviorally classified. In aspects, the comparison data of operation 504 may be used to classify an evidence vector according to one or more rule sets, decision trees, response surface methodologies, or the like. For example, an evidence vector may be evaluated against a rule set for determining candidate anomalies. The rule set may comprise or represent a set of scenarios. In scenario 1, if an evidence vector is fit to cluster representing expected behavior and there is a high similarity between the vector and cluster centroid, the evidence vector is assigned a low probability of being an adverse event (e.g., likely to be an expected network flow behavior). In scenario 2, if an evidence vector is fit to cluster representing expected behavior and there is a low similarity between the vector and cluster centroid, the evidence vector is assigned a moderate probability of being an adverse event (e.g., less likely to be an expected network flow behavior). In scenario 3, if an evidence vector is fit to cluster representing unexpected behavior and there is a low similarity between the vector and cluster centroid, the evidence vector is assigned a moderate probability of being an adverse event (e.g., less likely to be an expected network flow behavior). In some aspects, scenarios 2 and 3 may be treated similarly. In other aspects, scenarios 2 and 3 may be distinguished by distance to, and prior probability of, the second best cluster match. For example, if the second best cluster match is an expected behavioral cluster, suspicion of adverse behavior may be reduced for the evidence vector. However, if the second best cluster match is an unexpected behavioral cluster, suspicion of adverse behavior may be increased for the evidence vector. In scenario 4, if an evidence vector is fit to cluster representing unexpected behavior and there is a high similarity between the vector and cluster centroid, the evidence vector is assigned a high probability of being an adverse event (e.g., likely to be an unexpected network flow behavior).

Figure 6:
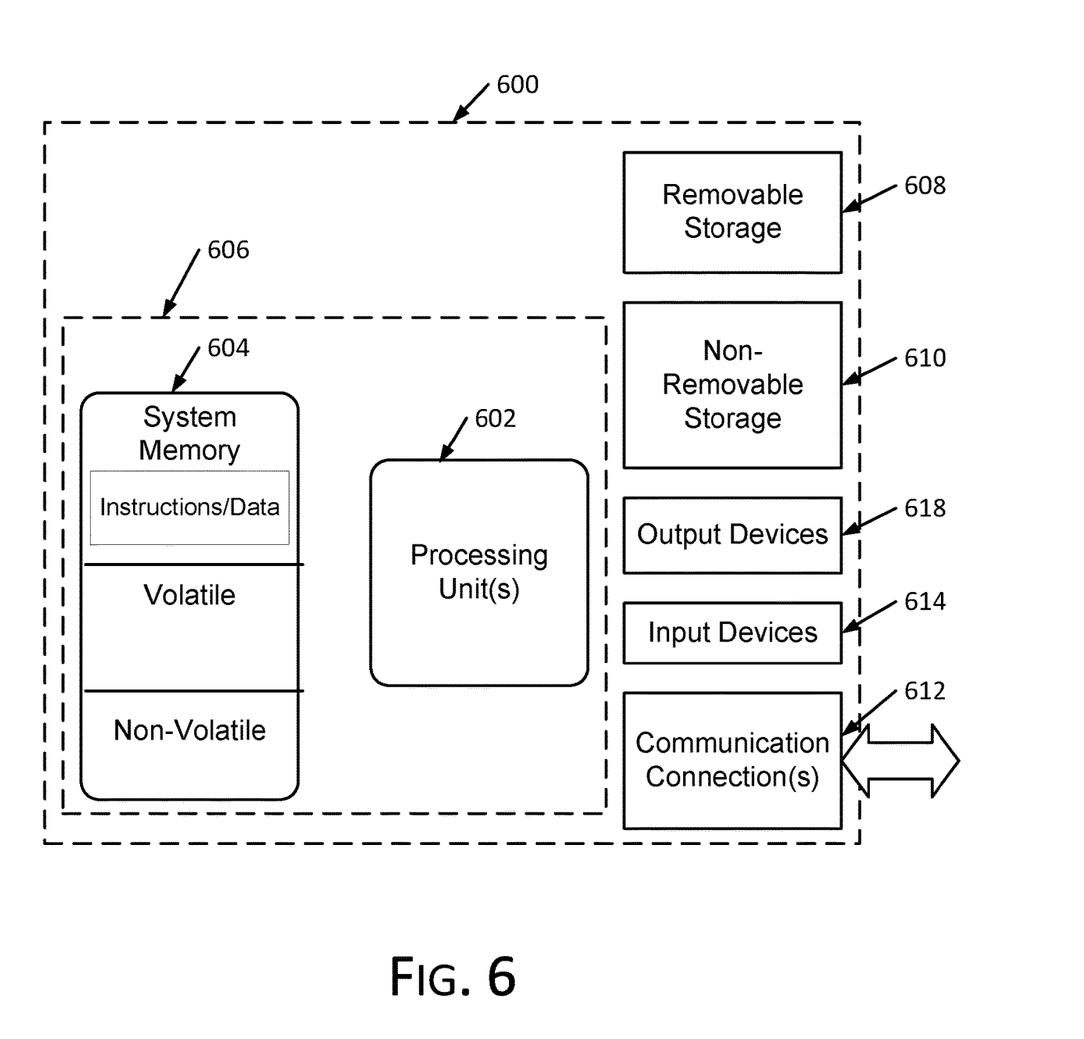
FIG. 6 illustrates one example of a suitable operating environment in which one or more of the present embodiments may be implemented.

FIG. 6 illustrates one example of a suitable operating environment 600 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, reputation information, category information, cached entries, instructions to perform the methods disclosed herein, etc.) may be volatile (such as RAM), non-volatile (such as ROM, flash memory, etc.), or some combination of the two. This most basic configuration is illustrated in FIG. 6 by dashed line 606. Further, environment 600 may also include storage devices (removable, 608, and/or non-removable, 610) including, but not limited to, magnetic or optical disks or tape. Similarly, environment 600 may also have input device(s) 614 such as keyboard, mouse, pen, voice input, etc. and/or output device(s) 616 such as a display, speakers, printer, etc. Also included in the environment may be one or more communication connections, 612, such as LAN, WAN, point to point, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system for identifying anomalous network behavior, comprising:
   at least a first processor; and
   memory coupled to the at least one processor, the memory comprising computer executable instructions that, when executed by the at least one processor, performs a method for identifying anomalous network behavior, the method comprising:
   receiving sensor data for an event representative of a network flow;
   extracting characteristics of the sensor data and normalizing the data to generate an evidence vector for the event;
   evaluating the evidence vector against a directional cluster mapping of previously observed events;
   evaluating the evidence vector against a magnitude cluster mapping of previously observed events;
   generating a composite score from the directional cluster mapping evaluation and the magnitude cluster mapping evaluation, the composite score representing a probability that the evidence vector for the event represents a network anomaly; and
   comparing the probability with a threshold for identifying the network anomaly and, based said comparing, executing a network countermeasure.

2. The system of claim 1, wherein the sensor data is stored in a sensor data store and the sensor data is aggregated over a time period for the network flow.

3. The system of claim 1, wherein one or more of the extracted characteristics are predictive of whether the event is an anomaly.

4. The system of claim 1, further comprising applying the evidence vector to an analytics model to provide directional cluster mapping representing an expected behavior comprising protocol vectors and comparing the evidence vector to the protocol vectors to identify the most similar protocol vector, the protocol vectors representing an expected network behavior.

5. The system of claim 1, further comprising applying the evidence vector to an analytics model to provide magnitude cluster mapping representing an expected behavior comprising protocol vectors and comparing the evidence vector to the protocol vectors to identify the most similar protocol vector, the protocol vectors representing an expected network behavior.

6. The system of claim 1, wherein generating the composite score further comprises applying contextual factors including trending anomalies.

7. The system of claim 1, further comprising, providing the composite score to a policy engine to provide threat intelligence and the network countermeasure.

8. The system of claim 1, further comprising executing machine learning to classify the event, modify the composite score, and determine the network countermeasure.

9. The system of claim 1, further comprising training a model for determining expected network anomalies and emergent network behaviors.

10. The system of claim 1, further comprising categorizing a behavior of the network anomaly using binocular fusion.

11. A method for identifying anomalous network behavior, comprising:
receiving sensor data for an event representative of a network flow;
extracting characteristics of the sensor data and normalizing the data to generate an evidence vector for the event;
evaluating the evidence vector against a directional cluster mapping of previously observed events;
evaluating the evidence vector against a magnitude cluster mapping of previously observed events;
generating a composite score from the directional cluster mapping evaluation and the magnitude cluster mapping evaluation, the composite score representing a probability that the evidence vector for the event represents a network anomaly; and
comparing the probability with a threshold for identifying the network anomaly and, based said comparing, executing a network countermeasure.

12. The method of claim 11, wherein the sensor data is stored in a sensor data store and the sensor data is aggregated over a time period for the network flow.

13. The method of claim 11, wherein one or more of the extracted characteristics are predictive of whether the event is an anomaly.

14. The method of claim 11, further comprising applying the evidence vector to an analytics model to provide directional cluster mapping representing an expected behavior comprising protocol vectors and comparing the evidence vector to the protocol vectors to identify the most similar protocol vector, the protocol vectors representing an expected network behavior.

15. The method of claim 11, further comprising applying the evidence vector to an analytics model to provide magnitude cluster mapping representing an expected behavior comprising protocol vectors and comparing the evidence vector to the protocol vectors to identify the most similar protocol vector, the protocol vectors representing an expected network behavior.

16. The method of claim 11, wherein generating the composite score further comprises applying contextual factors including trending anomalies.

17. The method of claim 11, further comprising, providing the composite score to a policy engine to provide threat intelligence and the network countermeasure.

18. The method of claim 11, further comprising executing machine learning to classify the event, modify the composite score, and determine the network countermeasure.

19. The method of claim 11, further comprising training a model for determining expected network anomalies and emergent network behaviors.

20. The method of claim 11, further comprising categorizing a behavior of the network anomaly using binocular fusion.

* * * * *